United States Patent [19]

Verrilli

[11] Patent Number: 5,360,039

[45] Date of Patent: Nov. 1, 1994

[54] WASTE OIL COLLECTOR

[76] Inventor: Michael J. Verrilli, 2985 Montessouri St., Las Vegas, Nev. 89117

[21] Appl. No.: 95,333

[22] Filed: Jul. 22, 1993

[51] Int. Cl.$^5$ ............ B65B 39/00; B67C 11/00; F16N 31/00
[52] U.S. Cl. .................. 141/98; 184/1.5; 184/106; 141/331; 141/337; 141/338; 141/339; 220/573; 210/695
[58] Field of Search ............ 220/573; 184/106, 1.5; 141/98, 331, 338, 337, 339; 210/695

[56] References Cited

U.S. PATENT DOCUMENTS

| | | | |
|---|---|---|---|
| 4,054,184 | 10/1977 | Marcinko | 184/1.5 |
| 4,403,692 | 9/1983 | Pollacco | 184/1.5 X |
| 4,488,584 | 12/1984 | Hestehave et al. | 141/339 |
| 4,495,074 | 1/1985 | Hagiwara et al. | 210/695 |
| 4,697,670 | 10/1987 | Arruda | 184/1.5 |
| 4,702,290 | 10/1987 | Perez | 141/332 |
| 4,783,266 | 11/1988 | Titch et al. | 210/695 |
| 5,033,521 | 7/1991 | Martin | 141/337 |
| 5,082,035 | 1/1992 | Maxwell | 141/98 |
| 5,168,586 | 12/1992 | Small | 141/98 |
| 5,190,085 | 3/1993 | Dietzen | 141/98 |

Primary Examiner—Ernest G. Cusick
Attorney, Agent, or Firm—Hugh E. Smith

[57] ABSTRACT

A waste oil collection apparatus for collecting used oil from an engine and dispensing the oil into bottles, such as those in which replacement oil is provided. The apparatus includes a container having a raised cylindrical opening through which waste oil from an engine may be received into the container. A plurality of threaded couplers facilitate an attachment of the bottles to apertures in a sidewall of the container. A plurality of valves allow oil to be selectively dispensed from the container into the bottles from which new oil is supplied. The collector further includes an extensible funnel assent ply and a debris removal assembly having a magnet for removing metal particles from the waste oil.

1 Claim, 4 Drawing Sheets

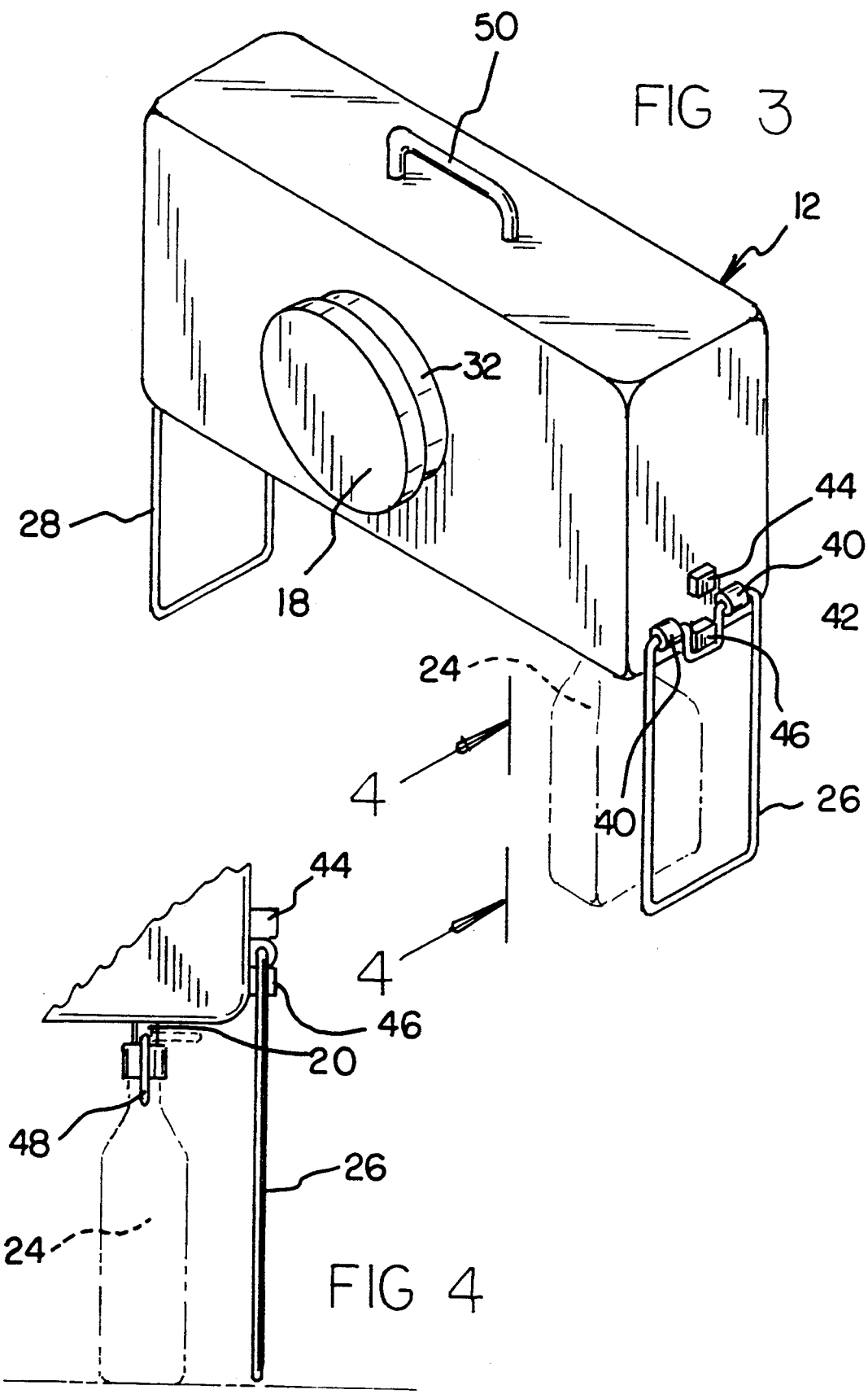

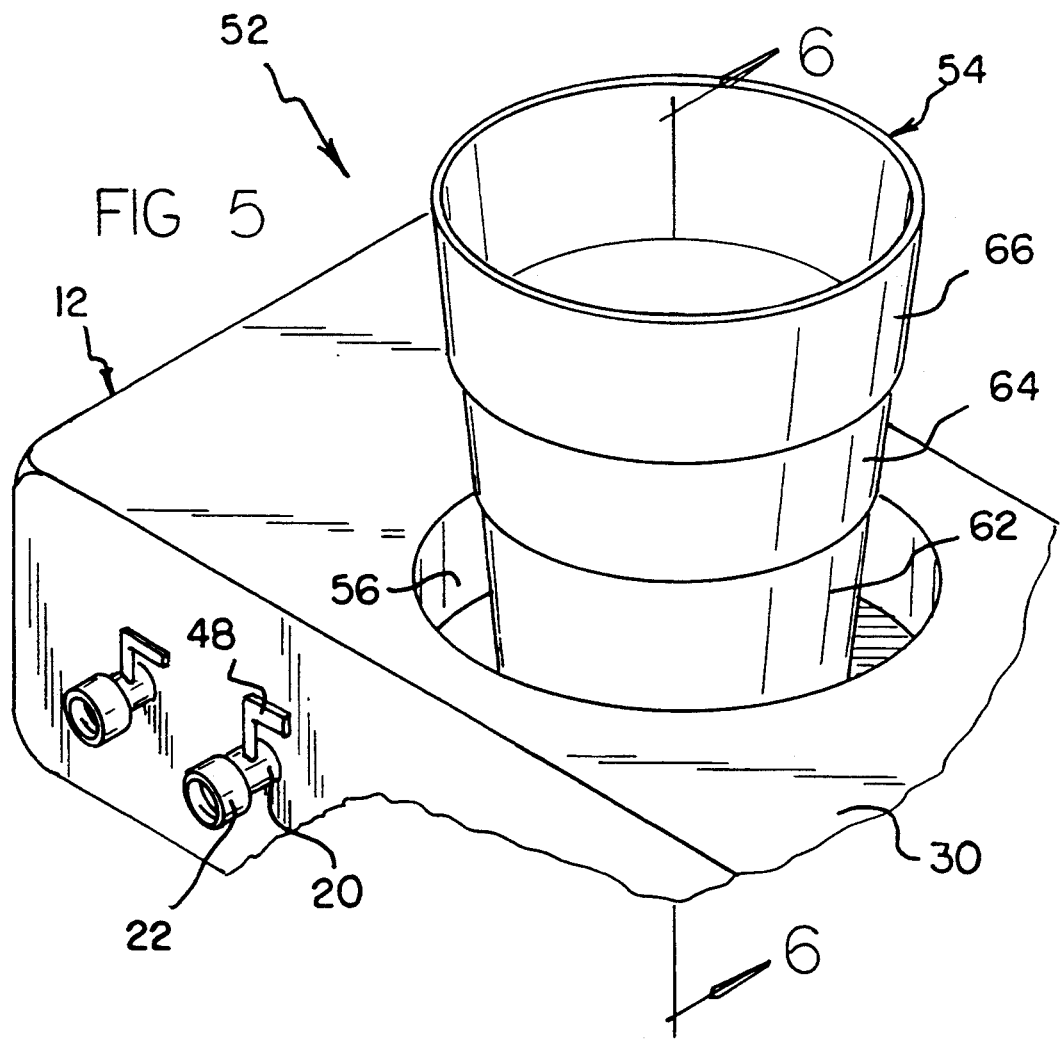
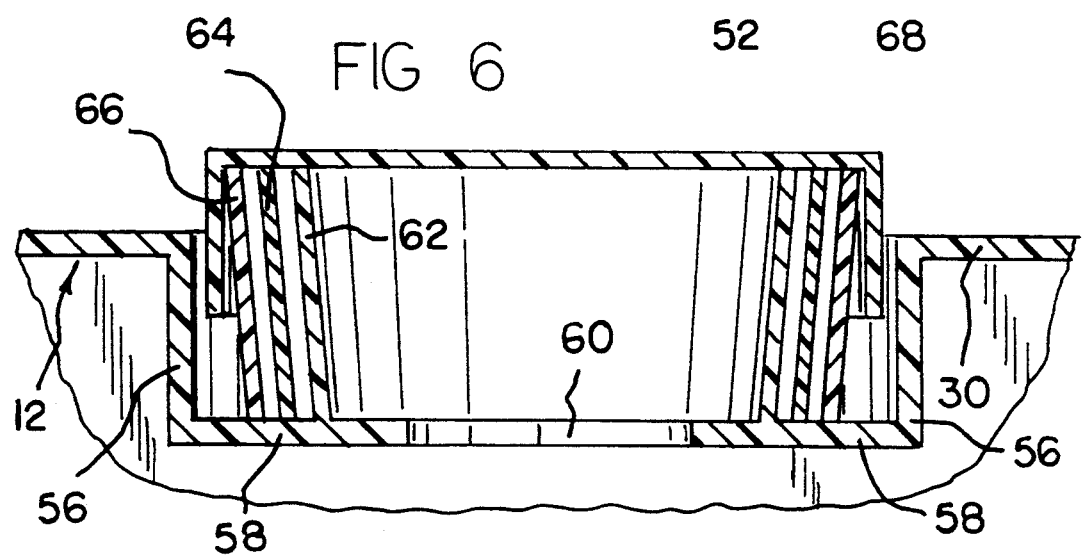

WASTE OIL COLLECTOR

BACKGROUND OF THE INVENTION

1. Field of the Invention

The present invention relates to containers and more particularly pertains to waste oil collectors which may be utilized for collecting used oil from an engine and dispensing the oil into bottles.

2. Description of the Prior Art

The use of containers is known in the prior art. More specifically, containers heretofore devised and utilized for the purpose of containing waste oil are known to consist basically of familiar, expected and obvious structural configurations, notwithstanding the myriad of designs encompassed by the crowded prior art which have been developed for the fulfillment of countless objectives and requirements.

For example, a waste oil collection and disposal system in illustrated in U.S. Pat. No. 5,067,530 which has a catch pan supported in a cantilever manner by a pair of legs. Apertures are provided in an end wall of the catch pan to which bottles for collecting the drained oil may be connected. The bottles extend outwardly and serve as a counter balance for supporting the catch pan in a cantilever manner upon the legs.

A dual purpose engine oil container is described in U.S. Pat. No. 5,080,149 that includes a collapsible and disposable container for engine oil which can package fresh engine oil for dispensing into an engine, or alternatively can be employed for catching and storing engine oil drained from an internal combustion engine. The container includes an accordion-like section which allows the container to expand or contract.

Another patent of interest is U.S. Pat. No. 4,802,599 which discloses an engine oil collector system. The system includes a collector vessel, a drain pan which can be releasably mounted on the collector vessel, and a threaded sealing cap. Used motor oil from an engine may be emptied into the drain pan and allowed to flow down a recess to an outlet and into a communicating entrance mouth of the vessel. The drain pan may then be removed from the collector vessel and the threaded cap can be used to seal the vessel's entrance mouth. A handle is provided for facilitating a transport of the vessel to a location for disposal of the used oil.

Other relevant patents include U.S. Pat. No. 5,082,035, and U.S. Pat. No. 5,092,457.

While these devices fulfill their respective, particular objectives and requirements, the aforementioned patents do not describe a waste oil collection apparatus for collecting used oil from an engine and dispensing the oil into bottles which includes a container having a raised cylindrical opening through which waste oil from an engine may be received, a plurality of threaded couplers that facilitate an attachment of a plurality of bottles to apertures in a sidewall of the container, and a plurality of valves that allow oil to be selectively dispensed from the container into the bottles from which new oil is supplied. Furthermore, prior art containers do not include both an extensible funnel assembly and a debris removal assembly in which a magnet for removing metal particles from the waste oil is provided.

In this respect, the waste oil collector according to the present invention substantially departs from the conventional concepts and designs of the prior art, and in so doing provides an apparatus primarily developed for the purpose of collecting used oil from an engine and dispensing the oil into bottles, such as those in which replacement oil is provided.

SUMMARY OF THE INVENTION

In view of the foregoing disadvantages inherent in the known types of containers now present in the prior art, the present invention provides a new waste oil collector construction wherein the same can be utilized for collecting used oil from an engine and dispensing the oil into bottles. As such, the general purpose of the present invention, which will be described subsequently in greater detail, is to provide a new waste oil collector apparatus which has many of the advantages of the containers mentioned heretofore and many novel features that result in a waste oil collector which is not anticipated, rendered obvious, suggested, or even implied by any of the prior art containers, either alone or in any combination thereof.

To attain this, the present invention essentially comprises a waste oil collection apparatus for collecting used oil from an engine and dispensing the oil into bottles, such as those in which replacement oil is provided. The apparatus includes a container having a raised cylindrical opening through which waste oil from an engine may be received into the container. A plurality of threaded couplers facilitate an attachment of the bottles to apertures in a sidewall of the container. A plurality of valves allow oil to be selectively dispensed from the container into the bottles from which new oil is supplied. The collector further includes an extensible funnel assembly and a debris removal assembly having a magnet for removing metal particles from the waste oil.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new waste oil collector apparatus which has many of the advantages of the containers mentioned heretofore and many novel features that result in a waste oil collector which is not anticipated, rendered obvious, suggested, or even implied by any of the prior art containers, either alone or in any combination thereof.

It is another object of the present invention to provide a new waste oil collector which may be easily and efficiently manufactured and marketed.

It is a further object of the present invention to provide a new waste oil collector which is of a durable and reliable construction.

An even further object of the present invention is to provide a new waste oil collector which is susceptible of a low cost of manufacture with regard to both materials and labor, and which accordingly is then susceptible of low prices of sale to the consuming public, thereby making such waste oil collectors economically available to the buying public.

Still yet another object of the present invention is to provide a new waste oil collector which provides in the apparatuses and methods of the prior art some of the advantages thereof, while simultaneously overcoming some of the disadvantages normally associated therewith.

Still another object of the present invention is to provide a new waste oil collector for collecting used oil from an engine and dispensing the oil into bottles, such as those in which replacement oil is provided.

Yet another object of the present invention is to provide a new waste oil collector having a container operable to collect oil being drained from an internal combustion engine.

Even still another object of the present invention is to provide a new waste oil collector which includes a plurality of valves that allow oil to be selectively dispensed from the container into the bottles from which new oil is supplied.

Even still yet another object of the present invention is to provide a new waste oil collector which substantially filters the used oil through the use of a debris removal assembly having a magnet for removing metal particles from the oil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a further perspective view of the invention.

FIG. 4 is a top plan view of a portion of the invention.

FIG. 5 is a perspective view of a portion of a second embodiment of a waste oil collector comprising the present invention.

FIG. 6 is a cross sectional view taken along line 6—6 of FIG. 5.

DESCRIPTION OF THE PREFERRED EMBODIMENT

Figure 1:
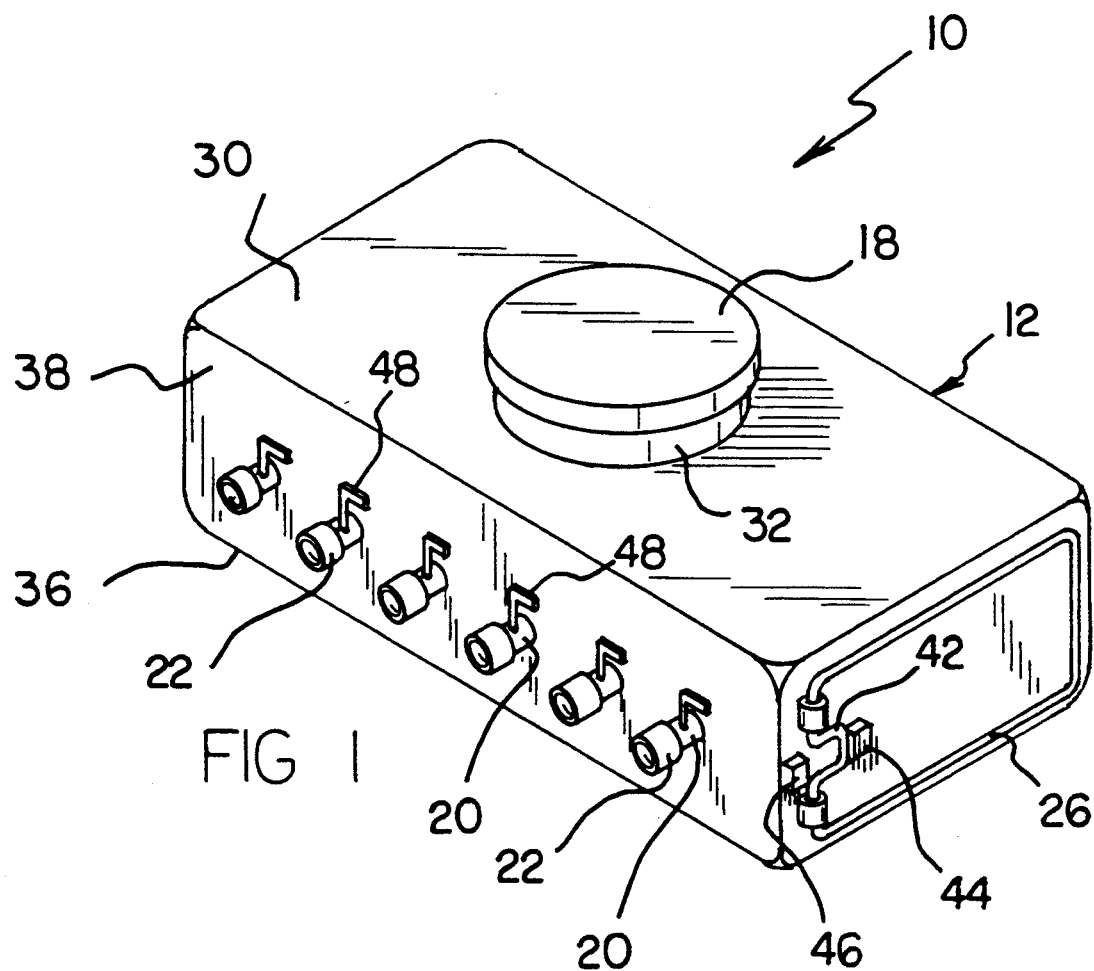
FIG. 1 is a perspective view of a first embodiment of a waste oil collector comprising the present invention.

With reference now to the drawings, and in particular to FIGS. 1-4 thereof, a new waste oil collector embodying the principles and concepts of the present invention and generally designated by the reference numeral 10 will be described.

Figure 2:
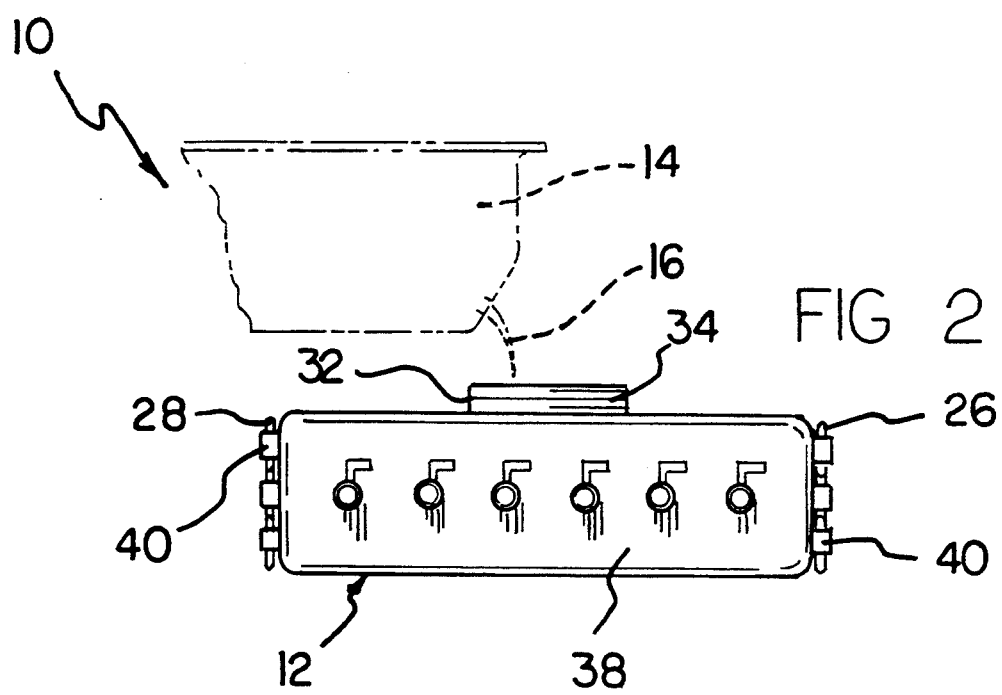
FIG. 2 is a front elevation view of the present invention.

The waste oil collector 10 comprises a container 12 which may be placed beneath an engine 14 to receive oil 16 draining therefrom as illustrated in FIG. 2. A cap 18 may be utilized to seal the container 12 after receiving the oil 16. A plurality of valves 20 are positioned in fluid communication with an interior of the container 12 and include a plurality of threaded couplers 22 which allow oil bottles 24 to be coupled thereto. After the oil 16 has been received into the container 12, the cap 18 may be used to seal the container so that the container may be positioned upon a pair of legs 26, 28, as best illustrated in FIG. 3. The valves 20 may then be selectively operated to allow oil 16 within the container 12 to flow into the oil bottles 24, as illustrated for one of such bottles in FIG. 4. The container 12 is sized to fit beneath a vehicle so that the oil 16 may be easily received from the engine 14 without a raising of the vehicle.

More specifically, it will be noted that the waste oil collector 10 comprises a container 12 having a substantially rectangular top wall 30 in which a raised cylindrical opening 32 is defined. The raised cylindrical opening 32 is located in a center area of the top wall 30 and includes threads 34 which allow the cap 18 to be rotatably coupled thereto. A bottom wall 36, having a substantially similar shape as the top wall 30, is positioned in a substantially co-planar manner with respect to the top wall and is integrally or otherwise orthogonally connected to a sidewall 38 which circumscribes a perimeter of the bottom wall. In a similar manner, the sidewall 38 is also orthogonally connected to a perimeter area of the top wall 30 to complete the container 12. The container 12 is operable to be positioned beneath the engine 14 of a vehicle to collect oil 16 draining therefrom. Although the container 12 has been defined as a substantially rectangular object, the container may be of any shape which facilitates its placement beneath a vehicle.

A pair of legs 26, 28 are pivotally connected to respectively opposed sides of the container 12 by a plurality of hinges 40. The hinges 40 are integrally or otherwise formed into the sidewall 38 of the container and they allow the legs 26, 28 to be pivoted with respect thereto so that the legs may be stored flatly against the sidewall or, alternatively, pivoted into a supporting position, as shown in FIG. 3. The pair of legs 26, 28 are each formed from a single strand of wire and the like into a substantially rectangular shape and each includes a substantially U-shaped portion 42 which is operable to engage either of a pair of catches 44, 46, as best shown for one of the legs 26 in FIG. 1. The catches 44, 46, illustrated for only one the legs 26, are utilized for securing both legs 26, 28 in either a stored position, or a supporting position, respectively.

A plurality of valves 20 are arranged along the sidewall 38 and selectively facilitate fluid communication between a plurality of threaded couplers 22 and the container 12 through unillustrated apertures in the sidewall. The valves 20 are of a conventional design and each includes a handle 48 which may be selectively operated in a well understood manner by a user to either allow or prevent fluid communication through the valve. The threaded couplers 22 are substantially hollow tubular men, pets which include unillustrated threads on an interior surface thereof. The threaded couplers 22 are each operable to threadably receive an oil bottle 24 in which fresh oil has been emptied from.

In use, the container 12 may be positioned beneath the engine 14 of a vehicle and allowed to receive oil 16 through the raised cylindrical opening 32. After the oil 16 has been thoroughly drained from engine 14, the container 12 may be removed from beneath the vehicle and sealed with the cap 18. The legs 26, 28 may then be pivoted into the supporting position and the emptied oil bottles 24, from which fresh oil has been supplied, may be threadably coupled to the threaded couplers 22. The waste oil collector 10 may then be manipulated into a standing position, as shown in FIG. 3, by a use of a container handle 50. The valves 20 may be selectively operated in a well understood manner to allow oil contained within the container 12 to flow into the oil bottles 24. Upon a draining of the waste oil 16 from the container 12, the oil bottles 24 may be removed from the threaded couplers 22 and sealed with their associated caps, whereby the waste oil 16 may be properly disposed of.

A second embodiment of the present invention as generally designated by the reference numeral 52 comprises substantially all of the features of the foregoing embodiment 10 and further comprises an extensible funnel assembly 54. As best shown in FIGS. 5-6, it can be shown that the extensible funnel assembly 54 comprises a recessed sidewall 56 having a substantially cylindrical shape which is integrally or otherwise connected to a center area of the top wall 30 in such a manner so as to project into an interior of the container 12. Orthogonally connected to the recessed side wall 56, is a funnel floor 58 which includes a drain aperture 60 therethrough. A first funnel portion 62 is positioned in a concentric manner with respect to the recess sidewall 56 and is fixedly secured to the funnel floor 58. Concentrically nested exteriorly of the first funnel portion 62 are a second funnel portion 64 and a third funnel portion 66 which are operable to be telescopically extended as shown in FIG. 5. Each of the funnel portions 62–66 is comprised of a substantially cylindrical member having a linearly increasing diameter along a longitudinal length thereof, thereby facilitating a frictional engagement between the funnel portions in their extended position which allows them to remain in the same.

The extensible funnel assembly 54 may be utilized for guiding waste oil 16 from an engine 14 into the container 12. After use, the extensible funnel assembly 54 may be compacted into a storage position and sealed with a cap 68 which frictionally engages the third funnel portion 66, as best shown in FIG. 6.

Figure 7:
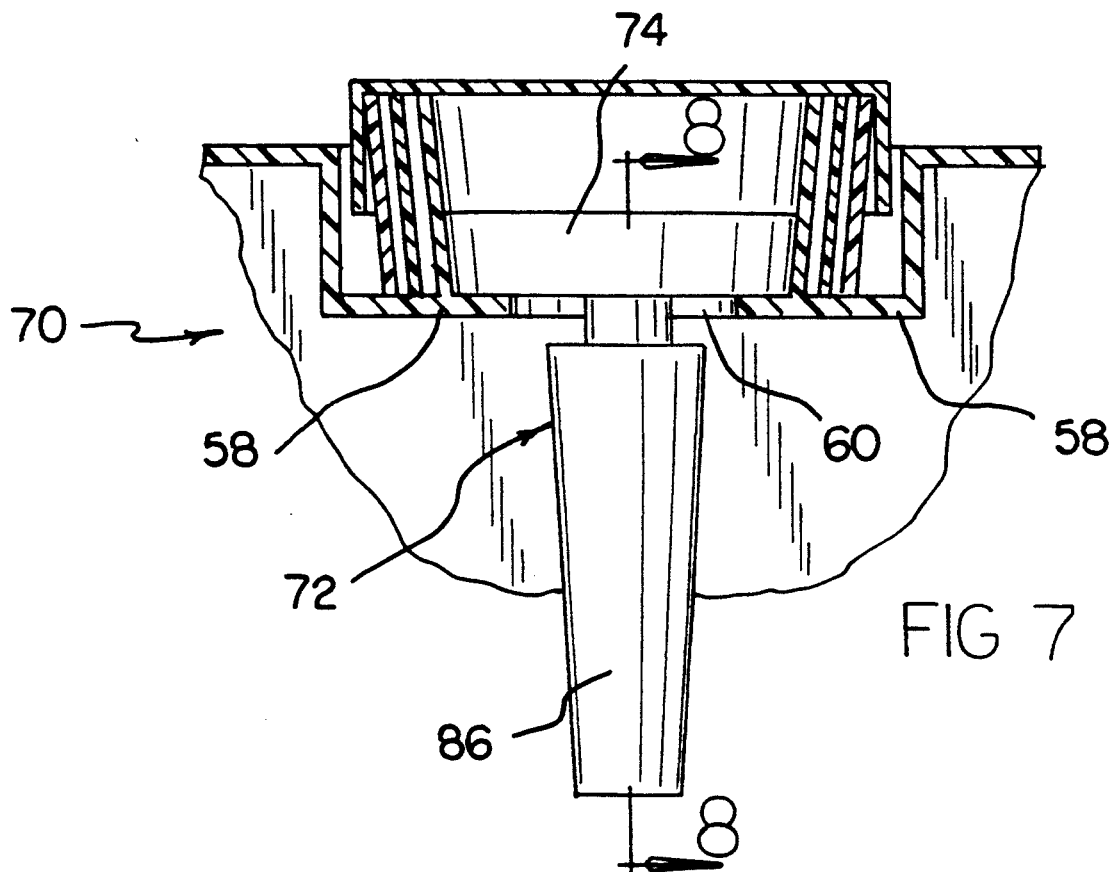
FIG. 7 is a cross sectional view of a third embodiment of the present invention taken through a center of an extensible funnel assembly showing a front elevation view of a debris removal assembly.
Figure 8:
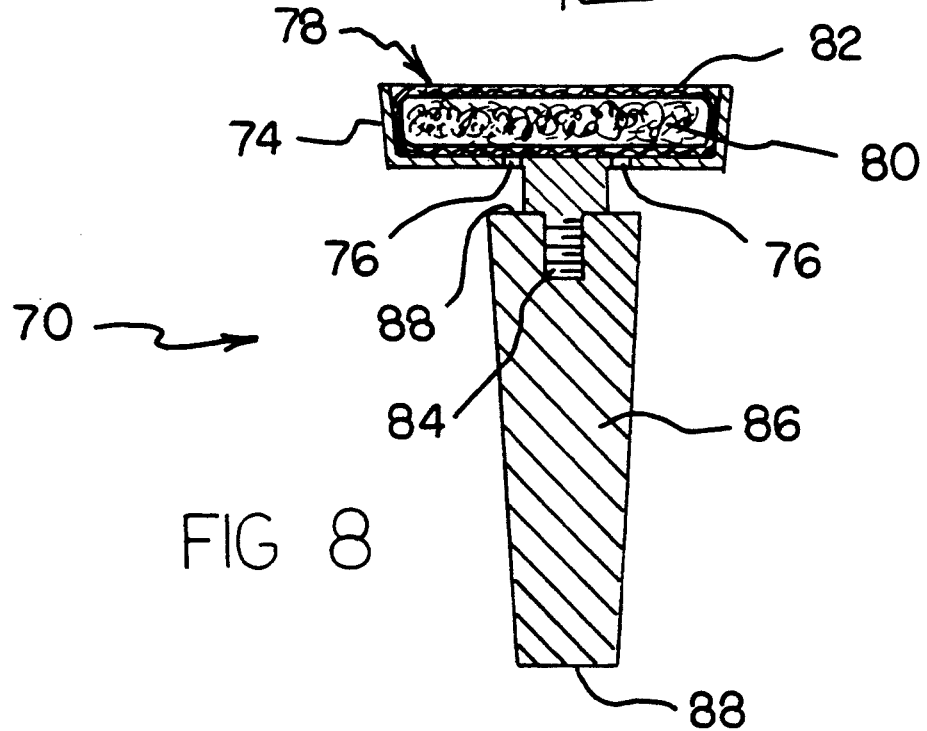
FIG. 8 is a cross sectional view taken along 8—8 of FIG. 7.

Comprising substantially all the features and structures of the previous embodiments 10, 52 is a third embodiment which is generally designated by the reference numeral 70 and may be viewed in FIGS. 7-8. It can be shown that the third embodiment 70 further comprises a debris removal assembly 72 which may be positioned within the drain aperture 60 upon the funnel floor 58 of the extensible funnel assembly 54 to filter and remove debris present in the waste oil 16. The debris removal assentply 72 comprises a filter tray 74 having a plurality of through-extending apertures 76 in a bottom area thereof. The filter tray 74 is sized to fit within and frictionally engage an interior of the first funnel portion 62, as best shown in FIG. 7. The filter tray 74 supports a filter 78 which includes a filtering material 80 surrounded by a mesh netting 82. The filtering material 80 may be comprised of any material useful for removing debris from oil, such as foam, cloth, and the like.

A projection 84 is integrally or otherwise secured to the bottom area of the filter tray 74 and includes unlabeled threads which are operable to engage and support a magnet 86 in a position immediately below the filter tray. The magnet 86 is formed in the shape of a truncated cone and includes a top area 88 which is positioned immediately below the plurality of apertures 76 and the filter tray 74. The waste oil 16 flowing into the container 12 must first be filtered by the filter material 80, whereby it may then pass through the plurality of apertures 76 to be deposited upon the top area 88 of the magnet 86. Because of the positioning of the magnet 86 beneath the plurality of apertures 76, no oil may pass through the drain aperture 60 without subsequently passing over the magnet. The magnet 86 is comprised of any substantially ferromagnetic material and is operable to remove and contain any metal particles present in the waste oil 16 being collected. Because of its truncated conical shape, metal particles removed from the waste oil 16 are collected upon a bottom area 88 of the magnet 86, whereby they are substantially shielded from a flow of oil 16 over the magnet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An oil collection and dispensing apparatus comprising:
- a container adapted to be positioned beneath a vehicle engine, said container having a top wall, a bottom wall, and a side wall therearound, said container further having an opening in said top wall of said container through which oil from said vehicle engine may flow into said container;
- a plurality of apertures in said side wall;
- a plurality of valves, with each of said valves being coupled to one of said apertures in said side wall, said valves being operable to selectively allow fluid communication therethrough;
- a plurality of couplers, each of said couplers being coupled to one of said valves, said couplers each being operable to engage a substantially emptied oil bottle and allow fluid communication between said bottle and said valve, whereby a plurality of said bottles may be simultaneously filled;
- a cap removable coupled to said top wall to cover said opening;
- at least one leg coupled to said container for supporting said container above a ground surface such that a portion of said sidewall is parallel to said ground surface;
- a funnel assembly in fluid communication with said opening, said funnel assembly comprising a plurality of concentrically nested funnel portions, said funnel portions being slidably operable to telescopically extend from a compacted position; and,
- a debris removable assembly removably coupled to a portion of said funnel assembly, said debris removably assembly comprising a filter tray having a plurality of apertures in a bottom area thereof, a filer having a filtering material encapsulated by a mesh netting positionable within said filter tray, and a magnet removably coupled to said filter tray and positioned below said plurality of apertures;
- wherein said magnet is formed in the shape of a truncated cone defining a top area thereof which is positioned immediately below said plurality of apertures in said filter tray and a bottom area thereof against which metal particles may reside removed from a flow of oil thereover.

* * * * *